United States Patent [19]

Kawamura

[11] Patent Number: 5,421,088
[45] Date of Patent: Jun. 6, 1995

[54] METHOD OF ASSEMBLING A PRELOAD-TYPE, DOUBLE-ROW BALL BEARING

[75] Inventor: Katsuyuki Kawamura, Chigasaki, Japan

[73] Assignee: Nippon Seiko Kabushiki Kaisha, Japan

[21] Appl. No.: 128,743

[22] Filed: Sep. 30, 1993

Related U.S. Application Data

[63] Continuation of Ser. No. 892,404, May 28, 1992, abandoned, which is a continuation of Ser. No. 645,479, Jan. 24, 1991, abandoned.

[30] Foreign Application Priority Data

Jan. 25, 1990 [JP] Japan ................. 2-15744

[51] Int. Cl.$^6$ .................. F16C 43/06; B23P 11/02
[52] U.S. Cl. ................... 29/898.062; 29/898.061; 29/898.09; 29/447; 384/450
[58] Field of Search ............. 29/898.06, 898.062, 29/898.061, 898.09, 447, 725; 384/450

[56] References Cited

U.S. PATENT DOCUMENTS

| | | | |
|---|---|---|---|
| 2,080,400 | 5/1937 | Fredrickson | 29/898.061 |
| 2,783,528 | 3/1957 | Menne | 29/447 X |
| 2,931,095 | 4/1960 | Esken | 29/201 |
| 3,340,590 | 9/1967 | Reynolds | 29/201 |
| 3,532,401 | 10/1970 | McKee | 308/195 |
| 4,476,614 | 10/1984 | Pittroff | 29/898.09 |
| 4,858,293 | 8/1989 | Rosenzweig | 29/447 X |
| 5,030,016 | 7/1991 | Schoeffter | 29/898.09 X |
| 5,086,560 | 2/1992 | Glazier | 29/447 X |

FOREIGN PATENT DOCUMENTS

| | | |
|---|---|---|
| 393916 | 2/1939 | Japan . |
| 57-97914 | 6/1982 | Japan . |
| 58-34724 | 3/1983 | Japan . |
| 1243398 | 8/1968 | United Kingdom . |
| 1472521 | 10/1975 | United Kingdom . |

Primary Examiner—Tom Hughes
Attorney, Agent, or Firm—Evenson, McKeown, Edwards & Lenahan

[57] ABSTRACT

In a method of assembling a double-row ball bearing of a preload-type, which includes a step of inserting a plurality of balls in a crescent-shaped gap formed between an outer race and an inner race which is deviated with respect to the outer race, a step of distributing the balls between the outer and inner races at equal intervals, and a step of disposing the outer race and the inner race concentrically with respect to each other, a step of producing a temperature difference is performed before the step of distributing the balls at equal intervals. In the step of producing temperature difference, the outer race is heated by a heating coil surrounding the outer race to expand the outer race. As a result, the negative gaps which have been existing between the outer and inner races and the balls are reduced or removed, and thus, the distribution of the balls at equal intervals can be achieved without causing flaws by dragging of the balls and without causing indentations in the raceway surfaces of the outer and inner races and in the surface of the balls. After the distribution of the balls, the heating of the outer race is stopped to allow it to return to a room temperature to thereby restore the negative gaps and to apply a preload to the bearing.

9 Claims, 6 Drawing Sheets

METHOD OF ASSEMBLING A PRELOAD-TYPE, DOUBLE-ROW BALL BEARING

This is a continuation of application Ser. No. 07/892,404 filed on 28 May 1992 and now abandoned, which is a continuation of application Ser. No. 07/645,479 filed on 24 Jan. 1991 and now abandoned.

BACKGROUND OF THE INVENTION

1. Field of the Invention

The present invention relates to an improvement in an assembly method of a preload-type, double-row ball bearing which has negative gaps respectively between an outer race and a plurality of balls and between the plurality of balls and an inner race after the double-row ball bearing is assembled and, in particular, to an assembly method of a preload-type, double-row ball bearing in which a plurality of balls in each row are distributed at equal intervals in a manner in which no flaws and indentations are formed in the race surfaces of outer and inner races and in the surfaces of the balls.

2. Description of the Art

U.S. Pat. No. 2,931,095 discloses a method of distributing balls by using an arrow-shaped jig, and a method of assembling a retainer. However, when these methods are applied to a preload-type ball bearing there is a fear of causing flaws by dragging in the raceway surfaces of the outer and inner races and in the surfaces of the balls due to a preload applied between the outer race and the balls and between the balls and the inner race during an operation of distributing the balls at equal intervals. Thus, there is a problem in which sounds and vibrations are generated by the flaws and satisfactory quality of the products cannot be insured.

U.S. Pat. No. 3,532,401 discloses an assembly method of a preload-type, double-row ball bearing. However, there is no description in this patented method as to the distribution of the balls at equal intervals after assembly of the ball bearing. Accordingly, the problem in the above-mentioned U.S. Pat. No. 2,931,095 is not solved.

Japanese Patent Laid-Open Publication No. 57-97914 discloses distribution of balls at equal intervals by reducing a preload by a loading thrust between the outer and inner races. However, since a minute ball indentation is apt to be caused in a raceway surface and in the ball surfaces due to the thrust, the problem of sound and vibrations in the above-mentioned U.S. Pat. Nos. 2,931,095 and 3,532,401 are not solved. Furthermore, another problem is caused in that control of the thrust is difficult.

Japanese Utility Model Publication No. 39-3916 discloses a technique for an angular ball bearing in which an assembly of an inner race, balls and a retainer is assembled from one side of another race which has been heated and expanded. However, the bearing disclosed herein is a single-row ball bearing and it is difficult for this technique to be applied to a preload-type, double-row ball bearing because the distance of insertion movement is long and control of the insertion is difficult. Therefore, there is a problem in which flaws by fitting and indentations are formed in the raceway surfaces and the ball surfaces. A further problem of generating sounds and vibrations is also involved as is the case in the above-mentioned U.S. Pat. No. 2,931,095.

Japanese Patent Laid-Open Publication No. 58-34724 discloses the disposition of the balls under a condition in which an inner race is deviated with respect to an outer race. Specifically, the outer race and the inner race are placed on a receiving table with the inner race deviated with respect to the outer race inside the outer race to thereby form a crescent-shaped gap between the outer and inner races. A predetermined number of balls are inserted in the crescent shaped gap and the outer and inner races are disposed substantially concentrically with respect to each other. Then the balls are fitted into the raceway grooves of the outer and inner races. However, the bearing which is assembled in this manner is not described as being a preload-type bearing and, thus, there is not disclosure as to concrete means for distributing balls at the time of assembly of the preload-type, double-row ball bearing. For this reason, in this prior art patent publication, the problem of the creation of flaws by dragging at the time of distribution the balls in the preload-type, double-row ball bearing is not solved. Thus, there is a problem similar to that in each of the prior art publications.

U.S. Pat. No. 3,340,590 discloses a method of distributing balls at equal intervals by using an arrow-shaped jig. However, the object bearing is not a preload-type bearing and, still further, the bearing is not a double-row type bearing. Accordingly, the problem in each of the prior art patent publications remains unsolved.

SUMMARY OF THE INVENTION

The present invention is intended to solve the problems which have not been solved in the prior art and it is an object of the present invention to provide a method of assembling a preload-type, double-row ball bearing in which during an operation of distributing balls at equal intervals between outer and inner races, the balls are prevented from being dragged between the raceway surfaces of the outer and inner races under a preload applied to the balls and the balls are also prevented from being formed with flaws and indentations to thereby insure a high quality of the bearing without generating sounds and vibrations during use.

In the present invention, a method of assembling a preload-type, double-row ball bearing having negative gaps respectively between an outer race and a plurality of balls and between the plurality of balls and an inner race after assembly comprises a step of inserting the plurality of balls between a gap formed between the outer race and the inner race, with the inner race disposed inside the outer race and deviated with respect to the outer race, a step of distributing the plurality of balls between the outer and inner races at equal intervals along a raceway of the balls under a condition in which relative intervals between a raceway surface of the outer race and the balls and between a raceway of the inner race and the balls are extended, and a step of disposing the outer and inner races concentrically with respect to each other during a time interval after the step of inserting the balls is finished and until the step of distributing the balls at equal intervals is finished. The improvement in the above-mentioned method comprises, before the step of distributing the balls at equal intervals, a step of producing a relative temperature difference between at least one of the outer and inner races and the balls so that the temperature of the at least one of the outer and inner races is high as compared with the temperature of the balls, and a step of removing the temperature difference to thereby apply a preload after the distribution of the balls at equal intervals.

In the step of producing a temperature difference, a relative temperature difference may be produced between one and the other of the outer and inner races.

The order of the step of producing the temperature difference, the step of distributing balls at equal intervals, and the step of removing the temperature difference is preferably in this specific order. However, the step of inserting the balls may be carried out in parallel with the step of producing the temperature difference, or it may be carried out before or after the step of producing the temperature difference. Further, the step of concentrically disposing the outer and inner races which is carried out after the step of inserting the balls may be carried out in parallel with the step of producing the temperature difference, or before, or after the step of producing the temperature difference, or it may be carried out in parallel with the step of distributing the balls at equal intervals.

In the step of producing the temperature difference, because a relative temperature difference is produced between at least one of the outer and inner races and the balls so that the temperature of the at least one of the outer and inner races is high and the temperature of the balls is relatively low, an interval between the raceway surface of the outer race and the balls and in interval between the raceway surface of the inner race and the balls are extended. As a result, the preload is reduced or removed and, under this condition, the balls are distributed at equal intervals along the raceway surfaces of the balls. For this reason, even when the ball bearing has double-row balls, flaws due to dragging and indentations are not caused. Also, in the step of disposing the outer and inner races concentrically with respect to each other, if such disposing is more easily carried out under the condition in which the interval between the raceway surfaces of the outer and inner races is extended, the step of concentrically disposing the outer and inner races may be performed after the step of producing the temperature difference. In this case, the step of concentrically disposing the outer and inner races may be performed before or in parallel with the step of distributing the balls at equal intervals. In the step of distributing the balls at equal intervals, if a comb-shaped jig known in the art is used, the time required for the step of distributing the balls at equal intervals can be reduced and, further, since the producing of the temperature difference is only required for the time period during which the step of distributing the balls at equal intervals is carried out, the time period in which the temperature difference is produced can also be reduced. Accordingly, the step of removing the temperature difference can be commenced subsequently. Because of the short time of the producing of the temperature difference, a degradation of the hardness of the metal members or a change in the dimensions of the constituting members can be avoided.

DESCRIPTION OF THE PREFERRED EMBODIMENTS

Firstly, the principles of the present invention will be described with reference to FIGS. 1, 2, 3 and 5. In this example for describing the principles of the present invention, a single-row ball bearing is shown; although it is a preload type of bearing.

Figure 1:
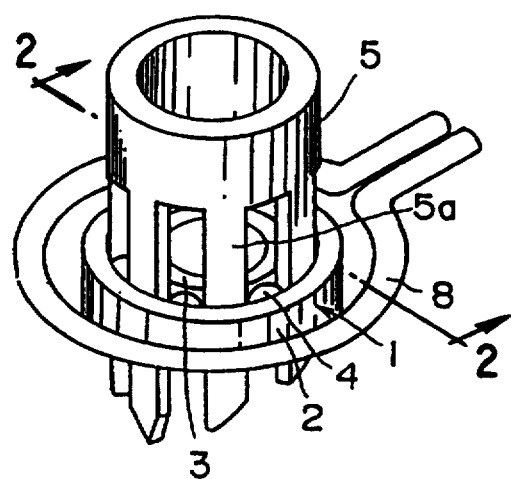
FIG. 1 is a perspective view illustrating the principles of the present invention.
Figure 2:
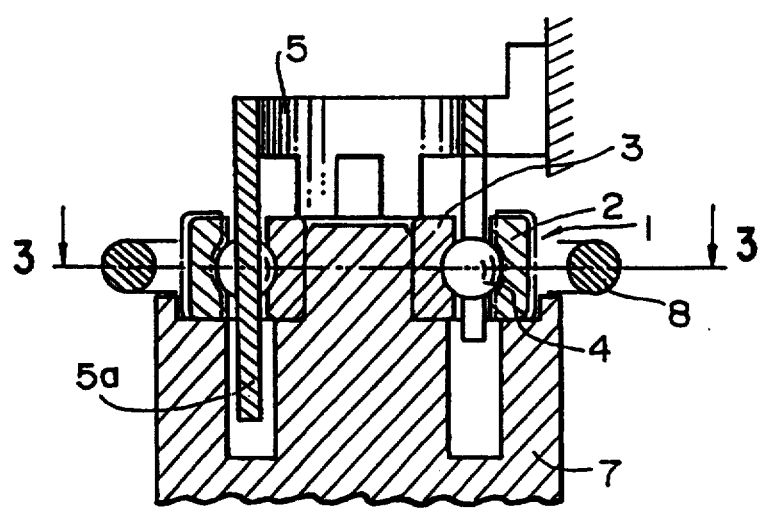
FIG. 2 is a cross sectional view taken along line 2—2 in FIG. 1.
Figure 3:
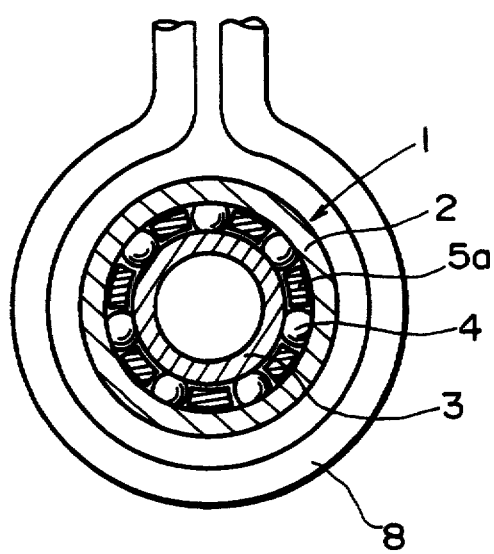
FIG. 3 is a cross sectional view taken along line 3—3 in FIG. 2.
Figure 5:
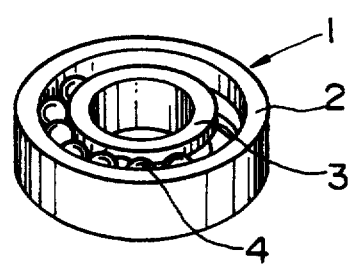
FIG. 5 is a perspective view of the bearing in a prestage of the condition shown in FIG. 1.

As shown in FIG. 5, an inner race 3 of a ball bearing 1 is placed in the inside of an outer race 2 so that the inner race 3 is deviated with respect to the outer race 2, that is, non-concentrically disposed with respect to the outer race 2. A predetermined number of balls 4 are inserted in a crescent-shaped gap formed between the outer race 2 and the inner race 3. This operation is the step of inserting the balls 4. Following this step, the ball bearing 1 is placed on a base 7 as shown in FIG. 2. In this condition, as shown in FIGS. 1 to 3, a heating coil 8 of a heating means, for example, a high frequency induction heating device (an oscillator, a current transformer, etc., not shown) is disposed surrounding the outer race 2 and substantially only the outer race 2 is heated for a short time. Thus, the outer race 2 is expanded as shown by the chain line as shown in FIG. 2. This operation is a method step of producing a temperature difference.

As a result of the expansion of the outer race 2, negative gaps respectively between the outer race 2 and the balls 4, and between the inner race 3 and the balls 4, are reduced, or the negative gaps are removed so that a gap is formed therebetween. Under this condition, the outer race 2 and the inner race 3 are disposed substantially concentrically with respect to each other. This operation is a method step of concentrically disposing the outer and inner races with respect to each other. By this operation, an interval between the raceway surfaces of the outer race 2 and the inner race 3 becomes equal and uniform at any position around the inner race 3. Here, each spacer portion 5a of a jig 5 is inserted between adjacent balls 4 while maintaining the concentricity thereof, and an operation for distributing the balls 4 at equal intervals is performed. This operation is a method step of distributing the balls at equal intervals.

The order of performing the step of producing a temperature difference, the step of distributing the balls at equal intervals and the step of removing the temperature difference is preferably in this specified order. However, the step of inserting the balls may be performed in parallel with, or before, or after the step of producing the temperature difference. Furthermore, the step of concentrically disposing which is performed after the step of inserting the balls may be performed in parallel with, or before, or after the step of producing the temperature difference, or it may be performed in parallel with the step of distributing the balls at equal intervals.

Subsequently, the heating of the outer race 2 by the heating coil 8 is stopped to make the outer race 2 return to room temperature. This causes the gaps between the outer race 2 and the balls 4 and between the balls 4 and the inner race 3 to become negative to thereby apply a preload. This operation is a method step of removing the temperature difference.

The heating by the heating coil 8 is made at a temperature in a range from about 100° to 150° C. and is performed for a short time. It is returned to the initial condition in a short time to thereby prevent a change in the hardness and the dimensions of the balls 4 and the outer and inner races 2 and 3. In the step of removing the temperature difference, the temperature difference may be removed by leaving the bearing 1 to stand to restore it to room temperature and thereby to apply a predetermined preload. Alternately, the bearing i may be forcibly cooled.

In the description of the principles of the present invention, the method of heating the outer case 2 is described. However, in place of the outer race 2 or in parallel with it, the inner race 3 may be cooled, or in place of the inner race 3 or in parallel with it, the balls 4 may be cooled.

A first embodiment of the present invention which employs the principles mentioned above will be described with reference to FIGS. 4 and 6. In this embodiment, the principles are applied to a preload-type, double-row, deep groove ball bearing.

Figure 4:
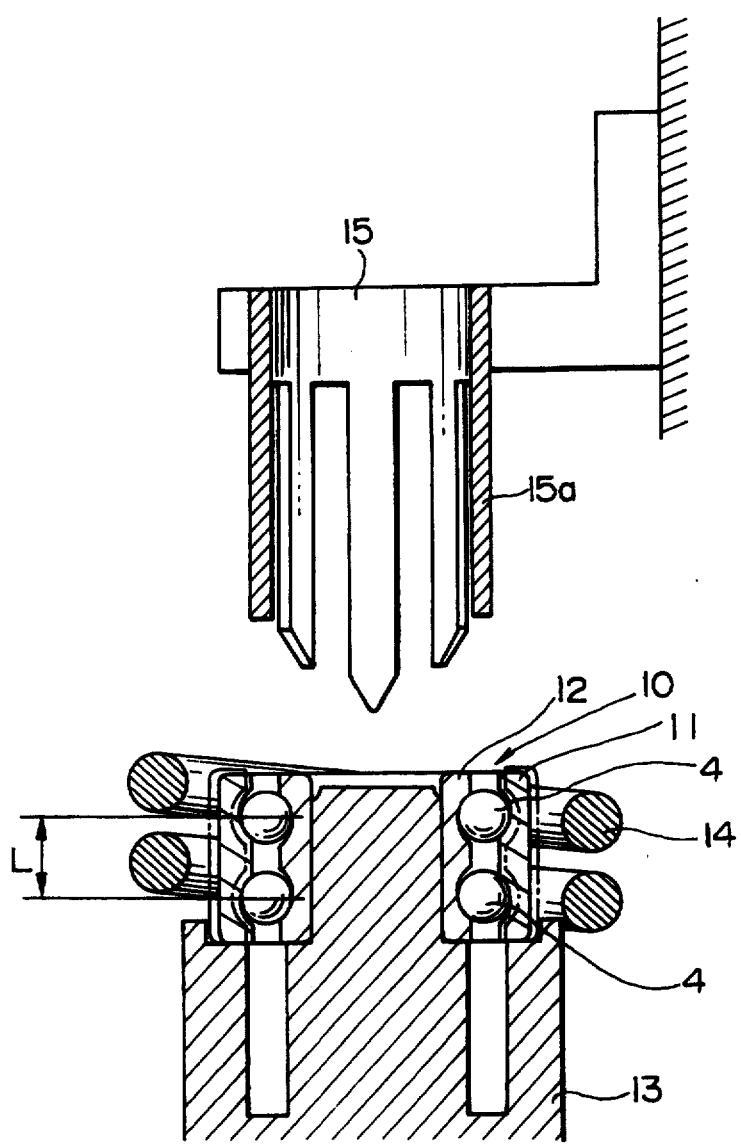
FIG. 4 is a cross sectional view illustrating a first embodiment of the present invention.
Figure 6:
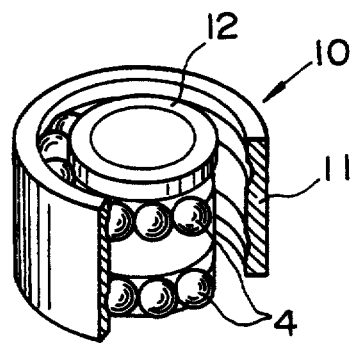
FIG. 6 is a perspective view partially cut away of the bearing in a condition before a step of distributing the balls at equal intervals in the first embodiment.

As shown in FIG. 6, a preload-type, double-row, deep groove ball bearing 10 has two rows of balls 4 between an outer race 11 and an inner race 12. Further, as shown in FIG. 4, the preload-type, double-row, deep groove ball bearing 10 is also placed on a base 13 and a heating coil 14 formed of two turns of a high frequency induction heating device is disposed surrounding the outer race 11.

The assembling operation of this preload-type, double-row, deep groove ball bearing 10 is similar to that of the preload-type, single-row, deep groove ball bearing 1 with which the principles of the present invention have been described. In a step of inserting, the inner race 12 is placed deviated with respect to an in the inside of the outer race 11. A predetermined number of balls 4 are inserted in a crescent-shaped gap formed between the outer race 11 and the inner race 12. In this case, since the bearing 10 is of the double-row type, the balls 4 of an upper row and the balls 4 of a lower row are aligned with each other so that the upper and lower row balls are in phase with each other. Then the ball bearing 10 is placed on the base 13. In a step of producing a temperature difference, substantially only the outer race 11 is heated by the two-turn heating coil 14 of the high frequency induction heating device. The outer race 11 is expanded as shown by the chain line in FIG. 4 so that negative gaps between the outer race 11 and the balls 4 and between the balls 4 and the inner race 12 are reduced, or removed to bring the outer race 11 and the inner race 12 into a condition having a gap therebetween. Subsequently, in a step of concentrically disposing, the outer race 11 and the inner race 12 are disposed substantially concentrically with respect to each other. Then a step of distributing the balls at equal intervals is commenced while maintaining the concentricity of the outer and inner races. The operation of distributing the balls 4 at equal intervals is carried out by inserting each spacer portion 15a of a jig 15 between respective adjacent balls 4. In this case, when a distance L between the upper and lower rows of balls 4 is large, this operation of distributing the balls 4 may be carried out separately for each row. In this case, the step of producing the temperature difference may be carried out separately for each row.

Following this, a step of removing the temperature difference is commenced and the heating of the outer race 11 by the heating coil 14 is terminated. The temperature of the outer race 11 is then returned to a room temperature to thereby make the gaps between the outer race 11 and the balls 4 and between the balls 4 and the inner race 12 negative so as to apply a preload to the balls 4.

In the present invention, in order to provide gaps between the outer race 11 and the balls 4 and between the balls 4 and the inner race 12, the step or producing a temperature difference is required to be performed prior to the step of distributing the balls at equal intervals. However, the timewise relationships between the step of concentrically disposing and the other steps are the same as the principles described in the foregoing.

Furthermore, in the first embodiment, the outer race is expanded by heating such that the negative gaps between the outer race and the balls and between the balls and the inner race are reduced or removed. However, as described in the principles of this invention, in place of or in parallel to the heating of the outer race, the inner race may be constricted by cooling to thereby reduce or remove the negative gaps between the outer race and the balls and between the balls and the inner race, so that the operation of distributing the balls at equal intervals can be smoothly performed. In either case, if the step of cooling is carried out before the step of distributing the balls at equal intervals, it will become more effective. Furthermore, the same effect will be obtained when only the balls are constricted by cooling while maintaining both the outer and inner races at substantially equal temperatures.

Figure 7:
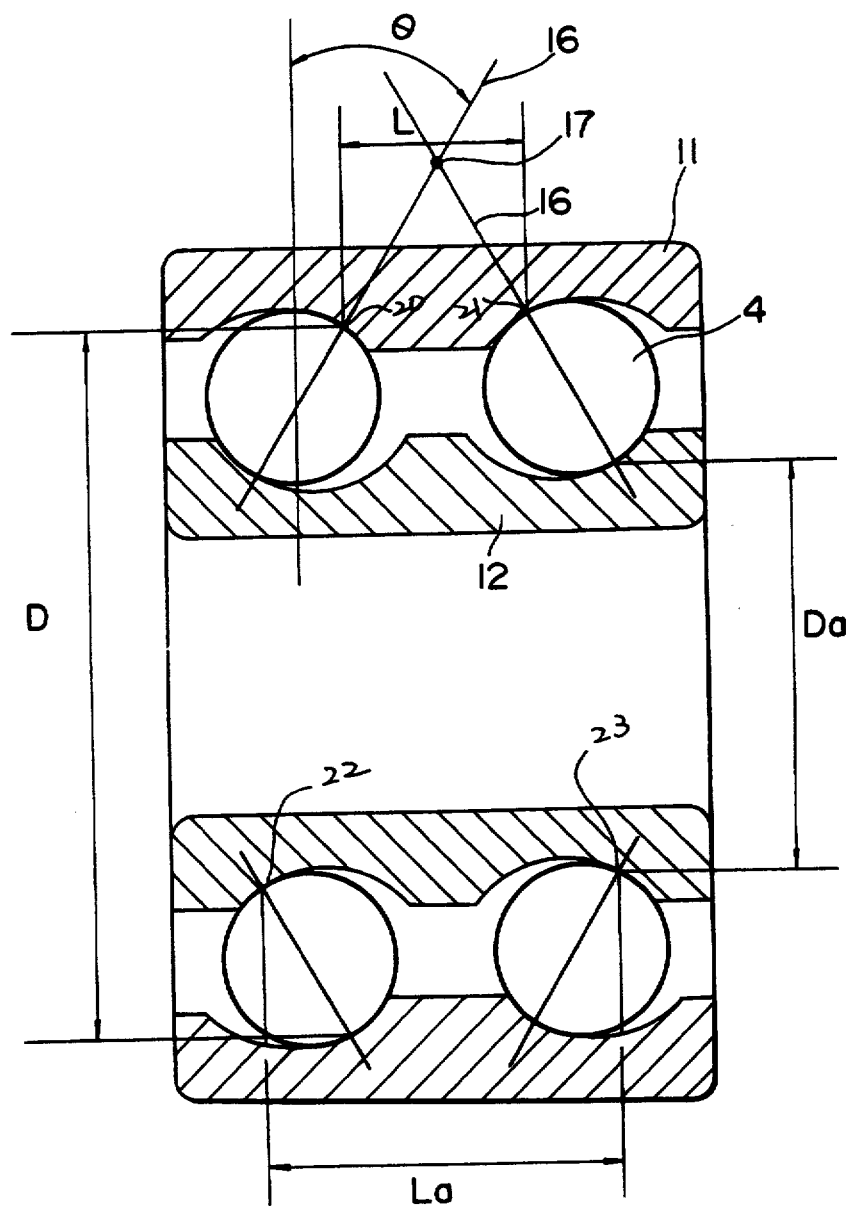
FIG. 7 is a perspective view illustrating a second embodiment of the present invention.

FIG. 7 shows a second embodiment of the present invention. In this embodiment, a preload-type, double-row ball bearing is of an outside intersection type in which contact lines 16 and 16 of both rows of balls intersect at the outside of the balls 4. Each of the contact lines 16 and 16 is formed by connecting contact points between the ball 4 and an outer race 11 and between the ball 4 and an inner race 12. The reference numeral 17 denotes an intersection point of the contact lines 16 and 16.

In this case, when a distance L between ball contact points 20 and 21 at which the balls 4 and 4 of the double rows are in contact with the outer race 11, a ball contact angle $\theta$, which is an angle between the contact line 16 and a line passing through the center of the ball 4 extending perpendicular to an axis of the ball bearing, and a diameter D of the ball contact points are in the following relationship expressed by:

$$\tan \theta < \frac{D}{L},$$

the outer race 11 is expanded by heating with respect to the inner race 12 and the balls 4. When these features are in the following relationship expressed by:

$$\tan \theta > \frac{D}{L},$$

the outer race 11 is constricted by cooling with respect to the inner race 12 and the balls 4.

Furthermore, when a distance La between ball contact points 22 and 23 at the inner race 12, the ball contact angle $\theta$, and an inner diameter Da are in the following relationship expressed by:

$$\tan\theta > \frac{Da}{La},$$

the inner race 12 is expanded by heating with respect to the outer race 11 and the balls 4. When they are in the following relationship expressed by:

$$\tan\theta < \frac{Da}{La}$$

the inner race 12 is constricted by cooling with respect to the outer race 11 and the balls 4.

The second embodiment is an example in which the preload force can be reduced, and the formulas expressing the relationships mentioned above are a certain measure thereof. However, since other conditions, such as the amount of negative gap, the ball diameter, the diameter size of the raceway groove, the space between the grooves, the coefficient of thermal expansion, the heat conducting condition, the temperature of the balls, etc., are also related, the selection as to which of the outer race and inner race is heated or cooled is determined depending on the above conditions. Specifically, if the preload is not decreased by is increased when either of the outer and inner races is heated or cooled, it is only required to reverse the heating and the cooling. The second embodiment described above is directed to the preload-type, double-row ball bearing of the outside intersection type and, in the case of the preload-type, double-row ball bearing of an inside intersection type in which the contact lines of both the rows of balls intersect at a point located towards the axis from the balls through which the contact lines pass, there is no need to reverse the heating and the cooling as in the second embodiment. Thus, it is only required to perform either of the heating of the outer race of the cooling of the inner race, or both.

The description of each step in the principles can be applied as it is to the description of each step in each of the embodiments.

As described in the foregoing, in the assembly method of the preload-type, double-row ball bearing of the present invention, in the step of producing the temperature difference, the temperature difference is produced between at least one of the outer and inner races and the balls so that the preload between the, raceway surfaces of the outer and inner races and the balls is reduced or removed. In this condition, a plurality of balls in each row between the outer and inner races are distributed at equal intervals along the raceway of the balls in the step of distributing the balls at equal intervals. As a result, in the operation of the distributing the balls at equal intervals, since the preload between the outer race and the balls and between the balls and the inner race is reduced and, furthermore, since a gap is developed between the races, there is no fear of causing flaws by dragging and indentations in the raceway surfaces and in the balls. As a result, it is possible to prevent the generation of abnormal sounds and vibrations in the bearing and thereby to manufacture a preload-type, double-row ball bearing with high quality.

Furthermore, by producing a temperature difference between one and the other of the outer and inner races, the preload between the outer race and the balls and between the balls and the inner race is further reduced. As a result, the above-mentioned advantageous effects are further increased.

What is claimed is:

1. In a method of assembling a preload-type, double-row ball bearing having negative gaps respectively between an outer race and a plurality of balls and between the plurality of balls and an inner race after the assembling, the method comprising the steps of:

inserting the plurality of balls in a crescent gap formed between the outer race and the inner race, the crescent gap being formed by disposing the inner race inside of the outer race at a position deviated and eccentric with respect to the outer race;

distributing the plurality of balls between the outer race and the inner race at equal intervals along a raceway defined by the outer and inner races;

disposing the outer race and the inner race concentrically with respect to each other during a time interval after the step of inserting the plurality of balls is finished and until the step of distributing the plurality of balls is finished;

at some time before completion of the step of distributing the balls, producing a relative temperature difference between at least one of the outer and inner races and the balls such that gaps between the inner race and the balls and between the outer race and the balls are increased, and removing the temperature difference, only after finishing the distribution of the balls at equal intervals so as to form within the ball bearing a negative gap whose width is smaller than the diameter of the balls such that a preload is applied to the ball bearing.

2. A method according to claim 1, wherein in the step of producing a relative temperature difference, said relative temperature difference is produced between one and the other of the outer race and the inner race so that a temperature of the one of the outer and inner races is high and a temperature of the other of the outer and inner races is relatively low.

3. A method as claimed in claim 1, wherein the step of inserting the balls, the step of disposing the inner race concentrically with the outer race, and the step of distributing the balls in equal intervals in the gap between the outer race and the inner race are performed in that specified order, and the step of producing the temperature difference is performed at any time before the start of the step of distributing the balls in equal intervals.

4. A method of assembling a preload-type double-row ball bearing as claimed in claim 1, wherein after the step of inserting the balls, the steps of distributing the balls at equal intervals and disposing the inner race concentrically with the outer race are performed simultaneously, and the step of producing the temperature difference is performed at any time before the start of the step of distributing the balls at equal intervals.

5. A method of assembling a multi-race ball bearing having an outer bearing member with outer race groove structure thereon, an inner bearing member with inner race groove structure thereon, and balls arranged between the outer and inner race groove structures, wherein the balls are distributed at equal intervals between the outer and inner race groove structures, said method comprising the steps of producing a relative temperature difference by bringing the outer bearing member to a temperature which is one of higher and lower than a temperature of the inner bearing member such that the temperature of at least one of the outer race groove structure and the inner race groove structure is high as compared with the temperature of the balls at some time before distribution of the balls at equal intervals between the outer and inner race groove structures is completed; and removing the relative temperature difference after distribution of the balls at the equal intervals is completed to apply a preload to the assembly of outer and inner bearing members and the balls distributed therebetween;

wherein the outer bearing member is formed to have a circular inner peripheral surface, with the outer race groove structure being formed at the inner peripheral surface to comprise first and second outer race grooves, and the inner bearing member is formed to have a circular outer peripheral surface, with the inner race groove structure being formed at the outer peripheral surface to comprise first and second outer race grooves;

wherein the balls are arranged between the inner and outer race groove structures by arranging the inner and outer bearing members eccentrically relative to each other to form a gap therebetween sufficient for insertion of the balls therethrough, with the balls being in a free state between the inner and outer race groove structures, and then by disposing the outer and inner bearing members concentrically relative to each other before distribution of the balls is completed; and wherein the outer bearing member is brought to the temperature which is lower than the temperature of the inner bearing member when a distance (L) between contact points of the balls with the outer race grooves, a ball contact angle ($\theta$) defined as an angle between a contact line formed by connecting points between the balls and the outer race grooves and between the balls and the inner race groove and a line passing through a center of the balls extending perpendicular to an axis of the ball bearing, and a diameter (D) defined by the ball contact points at the outer race grooves satisfies the relationship $$\tan\theta > \frac{D}{L}.$$

6. A method of assembling a multi-race ball bearing having an outer bearing member with outer race groove structure thereon, an inner bearing member with inner race groove structure thereon, and balls arranged between the outer and inner race groove structures, wherein the balls are distributed at equal intervals between the outer and inner race groove structures, said method comprising the steps of producing a relative temperature difference by bringing the inner bearing member to a temperature which is one of lower and higher than a temperature of the outer bearing member such that the temperature of at least one of the outer race groove structure and the inner race groove structure is high as compared with the temperature of the balls at some time before distribution of the balls at equal intervals between the outer and inner race groove structures is completed; and removing the relative temperature difference after distribution of the balls at the equal intervals is completed to apply a preload to the assembly of outer and inner bearing members and the balls distributed therebetween;

wherein the balls are arranged between the inner and outer race groove structures by arranging the inner and outer bearing members eccentrically relative to each other to form a gap therebetween sufficient for insertion of the balls therethrough, with the balls being in a free state between the inner and outer race groove structures, and then by disposing the outer and inner bearing members concentrically relative to each other before distribution of the balls is completed; and wherein the inner bearing member is brought to the temperature which is higher than the temperature of the outer bearing member when a distance (La) between ball contact points at the inner race grooves, a ball contact angle ($\theta$) defined as an angle between a contact line formed by connecting points between the balls and the outer race grooves and between the balls and inner race groove and a line passing through a center of the balls extending perpendicular to an axis of the ball bearing, and an inner diameter (Da) defined by contacts points at the inner race grooves satisfies the relationship $$\tan\theta > \frac{Da}{La}.$$

7. A method of assembling a preload-type, double-row ball bearing comprising an outer bearing member having a circular inner peripheral surface on which first and second outer race grooves are formed, an inner bearing member being relatively rotatable with respect to the outer bearing member and having a circular outer peripheral surface on which first and second inner race grooves are formed, a first ball row disposed between the first outer race groove and the first inner race groove to form a first bearing section, a second ball row disposed between the second outer race groove and the second inner race groove to form a second bearing/section, the first and second bearing sections being subjected to a preload in axially opposite directions through the outer and inner bearing members, and each of the race grooves having a ball bearing surface at least on an axial side thereof to which the preload is applied, comprising the steps of:

arranging the inner and outer bearing members in an eccentric relationship to form a crescent gap between the inner bearing member and the outer bearing member with the inner bearing member disposed eccentrically inside of the outer bearing member, inserting a plurality of balls in a free state through the crescent gap formed between the outer bearing member and the inner bearing member, so that the plurality of balls in the free state are inserted between the first outer race groove and the first inner race groove and between the second outer groove and the second inner race groove;

distributing the plurality of balls between the first outer race groove and the first inner race groove and between the second outer race groove and the second inner race groove at equal intervals by moving the balls along the grooves after the step of inserting the plurality of balls is started;

disposing the outer bearing member and the inner bearing member concentrically with respect to each other at some time after the step of inserting the plurality of balls is finished and by the time when the step of distributing the plurality of balls is finished;

producing a relative temperature difference at some time before the step of distributing the balls is finished, such that at least one of the outer and inner bearing members has a higher temperature than the balls; and removing the temperature difference between at least one of the outer and inner bearing members and the balls, after the step of distributing the balls is finished, so that a preload is applied to the first and second bearing sections.

8. The method of claims 7, wherein in the step of producing the relative temperature difference, the outer bearing member has a higher temperature than the inner bearing member.

9. The method of claim 7, wherein the steps of distributing the balls and of disposing the outer and inner bearing members concentrically with respect to each other are performed simultaneously after the step of producing the relative temperature difference is started.

* * * * *